Patented June 3, 1924.

1,496,436

UNITED STATES PATENT OFFICE.

CLARENCE V. STEINHART, OF WESTFIELD, NEW JERSEY.

INSECTICIDE.

No Drawing.   Application filed January 6, 1923.   Serial No. 611,170.

*To all whom it may concern:*

Be it known that I, CLARENCE V. STEINHART, a citizen of the United States, and a resident of Westfield, county of Union, State of New Jersey, have invented certain new and useful Improvements in Insecticides, of which the following is a specification.

My invention relates to insecticides and more particularly to that class of insecticides which are applied in the form of a liquid spray.

An important object of my invention is to provide a preparation which may be sprayed upon the plants and will become attached thereon in such a way as not to be blown off by wind or readily washed off by rain. At the same time, the invention has in view the avoidance of the use of chemically active or unstable substances in any such proportions as might be injurious to the plant structure or its growth.

The preferred composition according to my invention, comprises a sparingly soluble alkaline earth chromate, such as for example, calcium or barium chromate, an adhesive such as glue, starch, gelatine or other adhesive colloidal substance which is not injurious to plant life, a deliquescent such as calcium chloride, ammonium nitrate or calcium nitrate, and a suspension liquid such as water. The alkaline earth chromate acts as an internal toxic agent. The deliquescent acts to prevent the composition from drying out and dusting off the plant and in in the case of ammonium or calcium nitrate, this agent also acts as a fertilizer and plant food or tonic, in so far as any of it reaches the soil. These deliquescent agents may be used either alone or in conjunction with each other. The adhesive is employed as a binding ingredient to enable the composition to remain more or less permanently upon the plant. The suspension liquid serves to enable the other ingredients to be incorporated together into a homogeneous product.

As a specific example of the proportions which may be employed, I give the following:

35.3% calcium chromate or other alkaline earth chromate.
47.0% water.
11.8% adhesive.
5.9% calcium chloride, ammonium nitrate or calcium nitrate.

The composition may be prepared, for example, by first swelling the glue or other adhesive in a small quantity of water, after which the mixture is heated until melted or dissolved. The calcium chloride, ammonium nitrate or calcium nitrate dissolved in the remaining proportion of water is then mixed with the glue solution and finally the calcium chromate, in the form of a fine powder, is stirred into the mixture until a homogeneous mass is obtained. The sparingly soluble alkaline earth chromate will not go into solution except to a small extent, but will remain suspended. This will result in the formation of a more or less stiff paste, which may be packed in containers such as metal cans and supplied to the market in that form. This paste, however, is to be diluted or thinned with water and the dilute solution or mixture sprayed on to the plants from any approved type of spraying apparatus. The paste may be diluted with water, for example, in the proportions of four ounces of the paste composition to one gallon of water. This proportion is not fixed, however, as the exact strength of solution to use will depend upon the nature or delicacy of the plant and to some extent also upon the particular insect or other plant parasite which is to be exterminated. I should consider that anywhere from three to twelve ounces of paste per gallon of water might represent reasonable strengths of mixture to employ according to circumstances. I do not, however, mean to imply that the composition could not be advantageously employed in other dilutions.

I have found that this preparation is successful in the extermination of various kinds of insect and allied parasites including, for example, all kinds of aphis, Colorado potato beetle (especially in the larval stage) and the cotton boll weevil. I have, for example, successfully treated cotton plants using four ounces of paste to one gallon of water and prevented the attack of the boll weevil, and have also demonstrated the fact that the boll weevil and its larvæ or grubs are killed by application of this material and the eggs rendered sterile. It will be understood that when the mixture is sprayed upon the plants, it partially dries and forms a film which, while not so continuous as to prevent the breathing of the plant, is, nevertheless sufficient to prevent the boll weevil from entering and depositing the eggs. The materials employed are chemically stable so that they do not produce any injurious products.

I claim:—

1. An insecticide composition comprising a sparingly soluble alkaline earth chromate, a deliquescent agent, an adhesive agent, and water.

2. An insecticide composition comprising calcium chromate, calcium chloride, an adhesive and water.

3. An insecticide composition comprising a major portion of a sparingly soluble alkaline earth chromate, a lesser portion of a deliquescent agent, a colloidal adhesive and water.

4. An insecticide composition comprising a major portion of calcium chromate, a lesser portion of calcium chloride, a colloidal adhesive and water.

5. An insecticide composition comprising approximately 35% sparingly soluble alkaline earth chromate, 6% deliquescent agent, 12% adhesive, and 47% water.

6. An insecticide composition comprising approximately 35% calcium chromate, 6% calcium chloride, 12% adhesive and 47% water.

7. An insecticide composition comprising a sparingly soluble alkaline earth chromate, water, an adhesive, and a deliquescent agent, the chromate being in finely divided form distributed homogeneously throughout the mass.

8. An insecticide composition comprising calcium chromate, water, glue and calcium chloride, the calcium chromate being in finely divided form distributed homogeneously throughout the mass.

9. An insecticide composition comprising a sparingly soluble alkaline earth chromate, water, glue, and a deliquescent nitrate available as a plant food.

10. An insecticide composition comprising as an essential ingredient a sparingly soluble alkaline earth chromate.

CLARENCE V. STEINHART.